US008364185B2

(12) United States Patent
Thadasina et al.

(10) Patent No.: US 8,364,185 B2
(45) Date of Patent: Jan. 29, 2013

(54) METHOD AND SYSTEM FOR SYNCHRONIZING A CLOCK FOR AN ADJACENT NETWORK TO A CLOCK FOR AN OVERLAY NETWORK

(75) Inventors: Nivedan Thadasina, Allen, TX (US); John Csapo, Dallas, TX (US); Paul Gilliland, Fairview, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1245 days.

(21) Appl. No.: 11/261,215

(22) Filed: Oct. 28, 2005

(65) Prior Publication Data

US 2006/0234739 A1    Oct. 19, 2006

Related U.S. Application Data

(60) Provisional application No. 60/672,329, filed on Apr. 18, 2005.

(51) Int. Cl.
*H04B 7/00*  (2006.01)

(52) U.S. Cl. .................. 455/502; 370/350; 375/272

(58) Field of Classification Search .................. 455/502
See application file for complete search history.

(56) References Cited

U.S. PATENT DOCUMENTS

| | | | | |
|---|---|---|---|---|
| 3,798,378 A * | 3/1974 | Epstein | 370/510 |
| 3,873,773 A * | 3/1975 | Guy, Jr. | 370/505 |
| 4,506,360 A * | 3/1985 | Kryskow et al. | 370/457 |
| 4,578,796 A * | 3/1986 | Charalambous et al. | 379/93.34 |
| 4,677,614 A * | 6/1987 | Circo | 370/222 |
| 5,062,124 A * | 10/1991 | Hayashi et al. | 375/331 |
| 5,179,571 A * | 1/1993 | Schilling | 370/331 |
| 5,184,347 A * | 2/1993 | Farwell et al. | 370/350 |
| 5,212,804 A * | 5/1993 | Choate | 455/431 |
| 5,220,568 A * | 6/1993 | Howe et al. | 714/782 |
| 5,245,634 A * | 9/1993 | Averbuch | 375/357 |
| 5,345,467 A * | 9/1994 | Lomp et al. | 370/331 |
| 5,365,516 A * | 11/1994 | Jandrell | 370/335 |
| 5,367,524 A * | 11/1994 | Rideout et al. | 370/324 |
| 5,371,734 A * | 12/1994 | Fischer | 370/311 |
| 5,420,883 A * | 5/1995 | Swensen et al. | 375/138 |
| 5,510,797 A * | 4/1996 | Abraham et al. | 342/352 |
| 5,526,357 A * | 6/1996 | Jandrell | 370/346 |
| 5,710,773 A * | 1/1998 | Shiga | 370/512 |
| 5,726,976 A * | 3/1998 | Thompson et al. | 370/229 |
| 5,734,985 A * | 3/1998 | Ito et al. | 455/503 |
| 5,751,709 A * | 5/1998 | Rathnavelu | 370/395.4 |
| 5,774,829 A * | 6/1998 | Cisneros et al. | 701/475 |
| 5,805,645 A * | 9/1998 | Przelomiec et al. | 375/354 |
| 5,828,659 A * | 10/1998 | Teder et al. | 370/328 |
| 5,832,417 A * | 11/1998 | Petrucelli et al. | 702/101 |
| 5,862,142 A * | 1/1999 | Takiyasu et al. | 370/480 |
| 5,872,774 A * | 2/1999 | Wheatley et al. | 370/335 |
| 5,914,474 A * | 6/1999 | Spitz | 235/438 |
| 5,918,191 A * | 6/1999 | Patel | 702/84 |
| 5,920,571 A * | 7/1999 | Houck et al. | 370/458 |
| 5,956,289 A * | 9/1999 | Norman et al. | 365/233.1 |
| 5,973,643 A * | 10/1999 | Hawkes et al. | 342/457 |
| 5,991,279 A * | 11/1999 | Haugli et al. | 370/311 |
| 6,004,029 A * | 12/1999 | Moslehi et al. | 374/1 |
| 6,014,102 A * | 1/2000 | Mitzlaff et al. | 342/457 |
| 6,017,420 A * | 1/2000 | Foody et al. | 162/238 |
| 6,018,659 A * | 1/2000 | Ayyagari et al. | 455/431 |
| 6,028,855 A * | 2/2000 | Hirsch | 370/350 |
| 6,040,870 A * | 3/2000 | Small | 348/476 |
| 6,047,192 A * | 4/2000 | Maloney et al. | 455/456.2 |
| 6,101,175 A * | 8/2000 | Schorman et al. | 370/331 |
| 6,104,341 A * | 8/2000 | Mita et al. | 342/359 |
| 6,107,631 A * | 8/2000 | He | 250/339.09 |
| 6,111,927 A * | 8/2000 | Sokoler | 375/365 |
| 6,112,088 A * | 8/2000 | Haartsen | 455/437 |

(Continued)

*Primary Examiner* — Hai V Nguyen

(57) ABSTRACT

A method of synchronizing a clock for an adjacent network (AN) to a clock for an overlay network (ON) is provided. The method includes extracting an ON clock signal from an outgoing signal transmitted from the overlay network. The AN clock is synchronized to the ON clock based on the extracted ON clock signal.

20 Claims, 4 Drawing Sheets

U.S. PATENT DOCUMENTS

| | | | |
|---|---|---|---|
| 6,188,351 B1* | 2/2001 | Bloebaum | 342/357.15 |
| 6,188,885 B1* | 2/2001 | Kolev et al. | 455/413 |
| 6,208,871 B1* | 3/2001 | Hall et al. | 455/517 |
| 6,243,588 B1* | 6/2001 | Koorapaty et al. | 455/456.2 |
| 6,246,673 B1* | 6/2001 | Tiedemann et al. | 370/333 |
| 6,285,669 B1* | 9/2001 | Gutierrez | 370/335 |
| 6,321,090 B1* | 11/2001 | Soliman | 455/440 |
| 6,339,613 B2* | 1/2002 | Terry | 375/227 |
| 6,346,911 B1* | 2/2002 | King | 342/357.62 |
| 6,360,271 B1* | 3/2002 | Schuster et al. | 709/231 |
| 6,397,053 B1* | 5/2002 | Ghiazza | 455/343.1 |
| 6,433,739 B1* | 8/2002 | Soliman | 342/387 |
| 6,477,154 B1* | 11/2002 | Cheong et al. | 370/328 |
| 6,480,483 B2* | 11/2002 | Yahata et al. | 370/350 |
| 6,483,825 B2* | 11/2002 | Seta | 370/335 |
| 6,542,754 B1* | 4/2003 | Sayers et al. | 455/502 |
| 6,546,256 B1* | 4/2003 | Maloney et al. | 455/404.2 |
| 6,590,881 B1* | 7/2003 | Wallace et al. | 370/332 |
| 6,594,242 B1* | 7/2003 | Kransmo | 370/331 |
| 6,621,813 B2* | 9/2003 | Petch et al. | 370/350 |
| 6,665,332 B1* | 12/2003 | Carlson et al. | 375/130 |
| 6,683,867 B1* | 1/2004 | DeWulf | 370/350 |
| 6,704,573 B1* | 3/2004 | Paek et al. | 455/452.1 |
| 6,704,581 B1* | 3/2004 | Park et al. | 455/553.1 |
| 6,708,044 B1* | 3/2004 | Puknat et al. | 455/552.1 |
| 6,714,785 B1* | 3/2004 | Han | 455/440 |
| 6,724,739 B1* | 4/2004 | Tiedemann et al. | 370/331 |
| 6,781,976 B1* | 8/2004 | Sonning et al. | 370/335 |
| 6,785,558 B1* | 8/2004 | Stratford et al. | 455/561 |
| 6,788,656 B1* | 9/2004 | Smolentzov et al. | 370/328 |
| 6,788,668 B1* | 9/2004 | Shah et al. | 370/342 |
| 6,807,156 B1* | 10/2004 | Veres et al. | 370/252 |
| 6,829,229 B1* | 12/2004 | Palermo et al. | 370/347 |
| 6,873,647 B1* | 3/2005 | Tiedemann et al. | 375/145 |
| 6,873,664 B1* | 3/2005 | Clark | 375/340 |
| 6,925,286 B1* | 8/2005 | Kraiem et al. | 455/13.4 |
| 6,937,666 B2* | 8/2005 | Pasternak et al. | 375/272 |
| 6,940,831 B1* | 9/2005 | Omi et al. | 370/310.1 |
| RE38,808 E * | 10/2005 | Schuchman et al. | 342/357.12 |
| 6,961,398 B2* | 11/2005 | Dick et al. | 375/356 |
| 6,965,585 B2* | 11/2005 | Grilli et al. | 370/331 |
| 6,980,589 B1* | 12/2005 | Babb et al. | 375/222 |
| 6,980,615 B2* | 12/2005 | Dick et al. | 375/356 |
| 6,980,803 B2* | 12/2005 | Johansson | 455/438 |
| 6,981,063 B1* | 12/2005 | Eggers et al. | 709/248 |
| 6,982,971 B2* | 1/2006 | Tiedemann et al. | 370/333 |
| 7,002,948 B2* | 2/2006 | Kato | 370/350 |
| 7,020,436 B2* | 3/2006 | Schmutz | 455/9 |
| 7,023,928 B2* | 4/2006 | Laroia et al. | 375/260 |
| 7,031,271 B1* | 4/2006 | LaRosa et al. | 370/311 |
| 7,031,702 B2* | 4/2006 | Karabinis et al. | 455/427 |
| 7,031,711 B2* | 4/2006 | Soliman | 455/438 |
| 7,043,199 B2* | 5/2006 | Dai et al. | 455/13.4 |
| 7,046,754 B2* | 5/2006 | Demir et al. | 375/360 |
| 7,054,308 B1* | 5/2006 | Conway | 370/356 |
| 7,058,050 B2* | 6/2006 | Johansson et al. | 370/386 |
| 7,068,309 B2* | 6/2006 | Toyama et al. | 348/231.5 |
| 7,068,725 B2* | 6/2006 | Roth et al. | 375/272 |
| 7,092,426 B2* | 8/2006 | Dobson et al. | 375/130 |
| 7,106,709 B2* | 9/2006 | Davidsson et al. | 370/330 |
| 7,110,781 B1* | 9/2006 | Hulbert et al. | 455/502 |
| 7,123,628 B1* | 10/2006 | Hwang et al. | 370/469 |
| 7,126,967 B2* | 10/2006 | Sonning et al. | 370/510 |
| 7,133,928 B2* | 11/2006 | McCanne | 709/238 |
| 7,151,756 B1* | 12/2006 | Park et al. | 370/331 |
| 7,158,505 B2* | 1/2007 | Dick et al. | 370/350 |
| 7,167,713 B2* | 1/2007 | Anderson | 455/456.1 |
| 7,171,225 B2* | 1/2007 | Krasner et al. | 455/502 |
| 7,190,703 B1* | 3/2007 | Heitmann | 370/508 |
| 7,200,768 B2* | 4/2007 | Andersson et al. | 713/400 |
| 7,212,157 B2* | 5/2007 | Lee et al. | 342/357.15 |
| 7,212,508 B2* | 5/2007 | Tiedemann, Jr. | 370/335 |
| 7,239,675 B2* | 7/2007 | Zehavi et al. | 375/334 |
| 7,242,965 B2* | 7/2007 | Lin et al. | 455/561 |
| 7,272,399 B2* | 9/2007 | Han | 455/450 |
| 7,295,842 B2* | 11/2007 | Yang et al. | 455/436 |
| 7,346,352 B2* | 3/2008 | Colban et al. | 455/442 |
| 7,359,346 B2* | 4/2008 | Kim | 370/324 |
| 7,359,715 B2* | 4/2008 | Choksi | 455/456.1 |
| 7,362,740 B2* | 4/2008 | Fredriksson | 370/345 |
| 7,391,753 B2* | 6/2008 | Tiedemann et al. | 370/331 |
| 7,391,759 B2* | 6/2008 | Wallace et al. | 370/350 |
| 7,397,780 B2* | 7/2008 | Tiedemann, Jr. | 370/335 |
| 7,408,898 B1* | 8/2008 | Brown | 370/328 |
| 7,408,916 B2* | 8/2008 | Kassinen et al. | 370/350 |
| 7,440,762 B2* | 10/2008 | Maloney et al. | 455/456.1 |
| 7,447,253 B2* | 11/2008 | Abraham et al. | 375/145 |
| 7,539,085 B2* | 5/2009 | Pikula et al. | 368/10 |
| 7,602,815 B2* | 10/2009 | Houghton et al. | 370/506 |
| 7,653,017 B2* | 1/2010 | Huylebroeck | 370/311 |
| 7,668,548 B2* | 2/2010 | Choi | 455/437 |
| 7,822,124 B1* | 10/2010 | Rezvani | 375/240.27 |
| 7,844,276 B2* | 11/2010 | Kraiem et al. | 455/446 |
| 7,876,729 B1* | 1/2011 | Grilli et al. | 370/332 |
| 2001/0021179 A1* | 9/2001 | Tiedemann et al. | 370/333 |
| 2001/0021653 A1* | 9/2001 | Han | 455/450 |
| 2001/0022779 A1* | 9/2001 | Wheatley et al. | 370/252 |
| 2001/0038622 A1* | 11/2001 | Kato | 370/350 |
| 2002/0001299 A1* | 1/2002 | Petch et al. | 370/350 |
| 2002/0034947 A1* | 3/2002 | Soliman | 455/436 |
| 2002/0036985 A1* | 3/2002 | Jonas et al. | 370/235 |
| 2002/0054611 A1* | 5/2002 | Seta | 370/503 |
| 2002/0072370 A1* | 6/2002 | Johansson et al. | 455/436 |
| 2002/0102994 A1* | 8/2002 | Tuutijarvi | 455/456 |
| 2003/0002525 A1* | 1/2003 | Grilli et al. | 370/465 |
| 2003/0023378 A1* | 1/2003 | Ichimura | 701/213 |
| 2003/0026371 A1* | 2/2003 | Laroia et al. | 375/362 |
| 2003/0033394 A1* | 2/2003 | Stine | 709/222 |
| 2003/0050082 A1* | 3/2003 | Nomura et al. | 455/503 |
| 2003/0137969 A1* | 7/2003 | Abdesselem et al. | 370/350 |
| 2003/0147362 A1* | 8/2003 | Dick et al. | 370/324 |
| 2003/0152028 A1* | 8/2003 | Raisanen et al. | 370/235 |
| 2003/0174666 A1* | 9/2003 | Wallace et al. | 370/324 |
| 2003/0214936 A1* | 11/2003 | Goff | 370/350 |
| 2004/0004945 A1* | 1/2004 | Monsen | 370/328 |
| 2004/0008661 A1* | 1/2004 | Myles et al. | 370/350 |
| 2004/0010616 A1* | 1/2004 | McCanne | 709/238 |
| 2004/0082356 A1* | 4/2004 | Walton et al. | 455/522 |
| 2004/0085938 A1* | 5/2004 | Tiedemann et al. | 370/335 |
| 2004/0120418 A1* | 6/2004 | Pasternak et al. | 375/272 |
| 2004/0152478 A1* | 8/2004 | Ruohonen et al. | 455/502 |
| 2004/0202119 A1* | 10/2004 | Edge | 370/324 |
| 2004/0213367 A1* | 10/2004 | Han | 375/354 |
| 2004/0218686 A1* | 11/2004 | Pasternak et al. | 375/272 |
| 2005/0117547 A1* | 6/2005 | Lu | 370/335 |
| 2005/0118946 A1* | 6/2005 | Colban et al. | 455/3.06 |
| 2005/0123236 A1* | 6/2005 | Ko et al. | 385/24 |
| 2005/0136945 A1* | 6/2005 | Kennedy et al. | 455/456.1 |
| 2005/0232307 A1* | 10/2005 | Andersson et al. | 370/503 |
| 2005/0272426 A1* | 12/2005 | Yang et al. | 455/436 |
| 2006/0025160 A1* | 2/2006 | Kodali et al. | 455/456.5 |
| 2006/0084404 A1* | 4/2006 | Laroia et al. | 455/266 |
| 2006/0116130 A1* | 6/2006 | Kennedy, Jr et al. | 455/456.1 |
| 2006/0153237 A1* | 7/2006 | Hwang et al. | 370/469 |
| 2006/0215618 A1* | 9/2006 | Soliman et al. | 370/337 |
| 2006/0268775 A1* | 11/2006 | O'Scolai et al. | 370/329 |
| 2007/0030887 A1* | 2/2007 | Hutchison et al. | 375/149 |
| 2007/0147293 A1* | 6/2007 | Tiedemann, Jr. | 370/329 |
| 2007/0165594 A1* | 7/2007 | Heinle et al. | 370/350 |
| 2007/0171125 A1* | 7/2007 | Abraham et al. | 342/357.09 |
| 2007/0202885 A1* | 8/2007 | Kennedy et al. | 455/456.1 |
| 2007/0216572 A1* | 9/2007 | Schnabel | 342/357.1 |
| 2007/0280096 A1* | 12/2007 | Yanover et al. | 370/201 |
| 2007/0291651 A1* | 12/2007 | Hwang et al. | 370/249 |
| 2007/0293185 A1* | 12/2007 | Hwang et al. | 455/403 |
| 2007/0293221 A1* | 12/2007 | Hwang et al. | 455/435.1 |
| 2008/0019424 A1* | 1/2008 | Green et al. | 375/146 |
| 2008/0117835 A1* | 5/2008 | Grilli et al. | 370/252 |
| 2008/0151881 A1* | 6/2008 | Liu et al. | 370/389 |
| 2008/0198698 A1* | 8/2008 | Pikula et al. | 368/47 |
| 2008/0198785 A1* | 8/2008 | Huang et al. | 370/312 |
| 2008/0214192 A1* | 9/2008 | Soliman | 455/436 |
| 2008/0248811 A1* | 10/2008 | Maloney et al. | 455/456.1 |
| 2011/0164607 A1* | 7/2011 | Farmer | 370/350 |

* cited by examiner

METHOD AND SYSTEM FOR SYNCHRONIZING A CLOCK FOR AN ADJACENT NETWORK TO A CLOCK FOR AN OVERLAY NETWORK

CROSS-REFERENCE TO RELATED APPLICATION AND CLAIM OF PRIORITY

The present disclosure is related to that disclosed in U.S. Provisional Patent No. 60/672,329, filed Apr. 18, 2005, entitled "Inter network clock synchronization." U.S. Provisional Patent No. 60/672,329 is assigned to the assignee of the present application. The subject matter disclosed in U.S. Provisional Patent No. 60/672,329 is hereby incorporated by reference into the present disclosure as if fully set forth herein. The present application hereby claims priority under 35 U.S.C. §119(e) to U.S. Provisional Patent No. 60/672,329.

TECHNICAL FIELD OF THE INVENTION

The present disclosure relates generally to wireless communications and, more specifically, to a method and system for synchronizing a clock for an adjacent network to a clock for an overlay network.

BACKGROUND OF THE INVENTION

There is a tremendous interest in the cellular industry in coming up with ways to provide quality service for in-building environments. In addition, cellular operators are constantly looking for ways to offload capacity from expensive macro-networks to low-cost networks. However, one challenge to making a low-cost cellular wireless access device is the clock module, which is relatively expensive to implement in conventional systems.

The clock module is fundamental to most wireless access points. The overall network integrity is tightly maintained by the clock module. This is typically done by outputting precision frequency and timing accuracy such that all wireless access points and subscriber devices, such as mobile phones, are fully synchronized.

Synchronization is vital when multiple wireless access points are networked into one complete system, such as a network of base stations that are adjacent to each other. A poorly synchronized system may result in an excessive percentage of dropped calls, poor voice quality, low data rates, and the like. However, the cost of implementing and producing a precision clock module is typically in the range of thousands of dollars. Thus, producing a product geared for home use, small office/home office (SOHO), enterprise and/or other low-capacity deployment applications is cost-prohibitive due to the need to include precision clock modules.

Therefore, there is a need in the art for an improved method for providing a synchronized clock for a wireless access point. In particular, there is a need for a less expensive method of providing a synchronized clock for a wireless access point such that low-capacity deployment applications may be produced in a cost-effective manner.

SUMMARY OF THE INVENTION

A method for synchronizing a clock for an adjacent network (AN) to a clock for an overlay network (ON) is provided. According to an advantageous embodiment of the present disclosure, the method includes extracting an ON clock signal from an outgoing signal transmitted from the overlay network. The AN clock is synchronized to the ON clock based on the extracted ON clock signal.

According to one embodiment of the present disclosure, the outgoing signal comprises a signal in an overhead channel transmitted from the overlay network.

According to another embodiment of the present disclosure, the overhead channel is monitored.

According to still another embodiment of the present disclosure, a system time is extracted from the overhead channel and a reference time is established for the adjacent network based on the extracted system time.

According to yet another embodiment of the present disclosure, location information is extracted for the overlay network, a one-way delay between the overlay network and the adjacent network is determined based on the location information, and the AN clock is resynchronized to the ON clock based on the one-way delay.

According to a further embodiment of the present disclosure, the location information comprises Global Positioning System coordinates.

According to a still further embodiment of the present disclosure, at least one timing report is requested from at least one mobile station, the timing report is received from the mobile station, and the AN clock is resynchronized to the ON clock based on the timing report.

According to yet a further embodiment of the present disclosure, the timing report comprises an ON time offset reference.

According to an even further embodiment of the present disclosure, the adjacent network is clocked using the synchronized AN clock signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
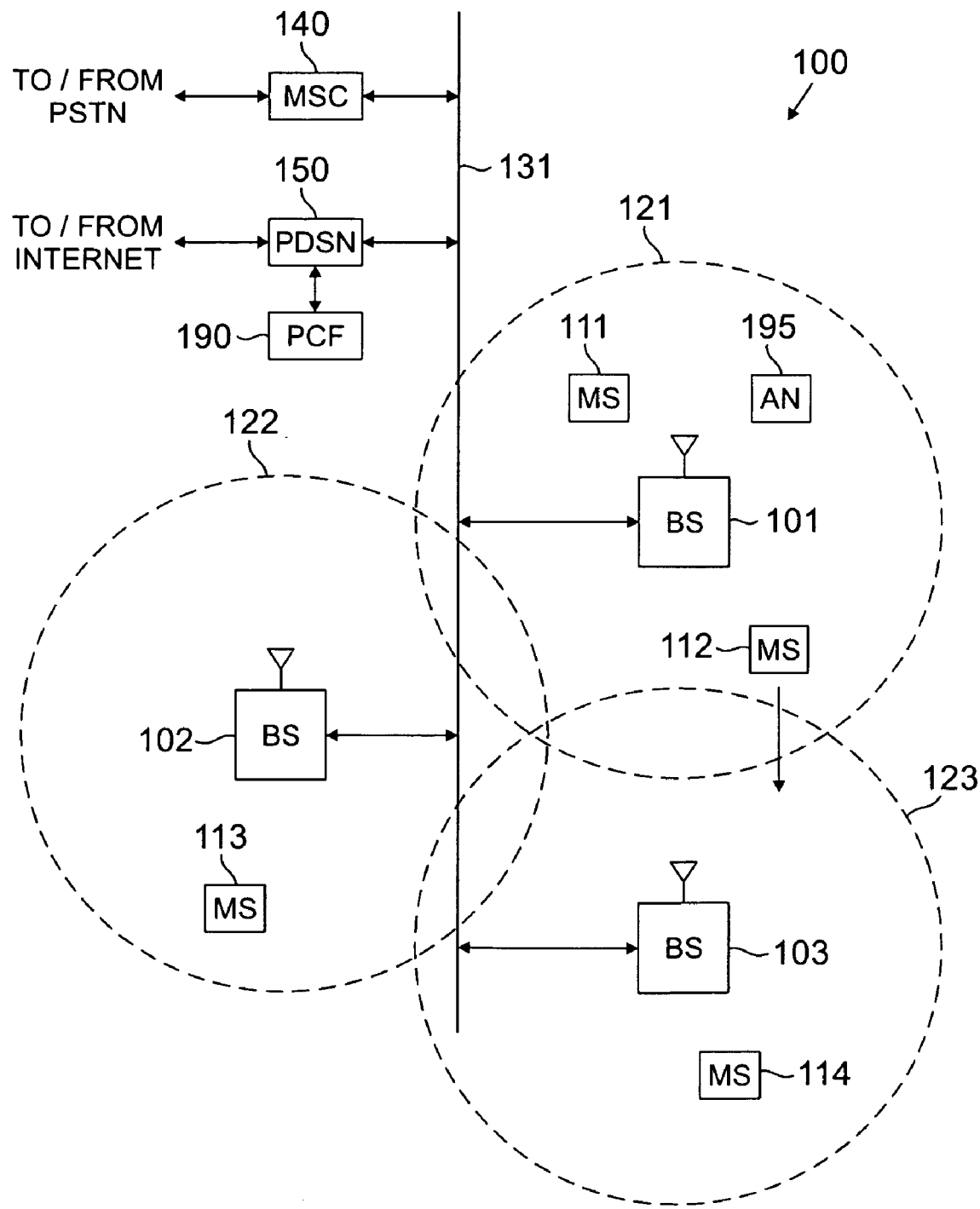
FIG. 1 illustrates an exemplary wireless network that is capable of synchronizing a clock for an adjacent network to a clock for an overlay network according to an embodiment of the present disclosure.

FIG. 1 illustrates an exemplary wireless network 100 that is capable of synchronizing a clock for an adjacent network to a clock for an overlay network according to an embodiment of the present disclosure. Wireless network 100 comprises a plurality of cells (also called cell sites), including exemplary cells 121, 122 and 123. Each of cells 121-123 contains a base station (BS) Cells 121 contains base station 101, cell 122 contains base station (BS) 102 and cell 123 contains base station (BS) 103. Base stations 101-103 communicate with a plurality of mobile stations, including exemplary mobile stations 111, 112, 113 and 114, over code division multiple access (CDMA) channels according to, for example, the IS-2000 standard (i.e., CDMA2000).

In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability). Additionally, other types of networks may use terms such as "subscriber station" or "mobile terminal" in place of the term "mobile station". It should be understood that the use of such alternative phrases to describe devices similar to the mobile stations described herein does not limit the scope of the present disclosure in any way.

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet or other data network (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, mobile station (MS) 111 is located in cell 121 and is in communication with BS 101. Mobile station (MS) 112 is also located in cell 121 and is in communication with BS 101. Mobile station (MS) 113 is located in cell 122 and is in communication with BS 102. Mobile station (MS) 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

In one embodiment of the present disclosure, wireless network 100 is associated with at least one adjacent network (AN) 195 that is capable of synchronizing a clock of the adjacent network 195 to a clock of an associated overlay network, such as base station 101 in the illustrated embodiment. Adjacent network 195 may comprise an underlay network within a macro-network coverage area or any other suitable wireless access point.

For a particular example, adjacent network 195 may comprise an underlay network that is used to provide capacity relief for a macro-network (e.g., BS 101) or that is used to support a macro-network (e.g., BS 101) that has insufficient signal strength to maintain quality of service (QoS). In these situations, the macro-network may have sufficient signal strength to provide overhead channels, such as CDMA pilot, CDMA synchronization channel, CDMA paging channel, and the like, to subscriber devices, such as mobile stations 111 and 112. However, the macro-network may not have enough traffic resources, such as radio frequency power, to provide the appropriate QoS.

Using the disclosed synchronization method and system described below, adjacent network 195 may be manufactured without an expensive clock module such as those used in macro-networks. Instead, adjacent network 195 may inexpensively extract clocking information from the relatively expensive and precise clock module of the macro-network.

Figure 2:
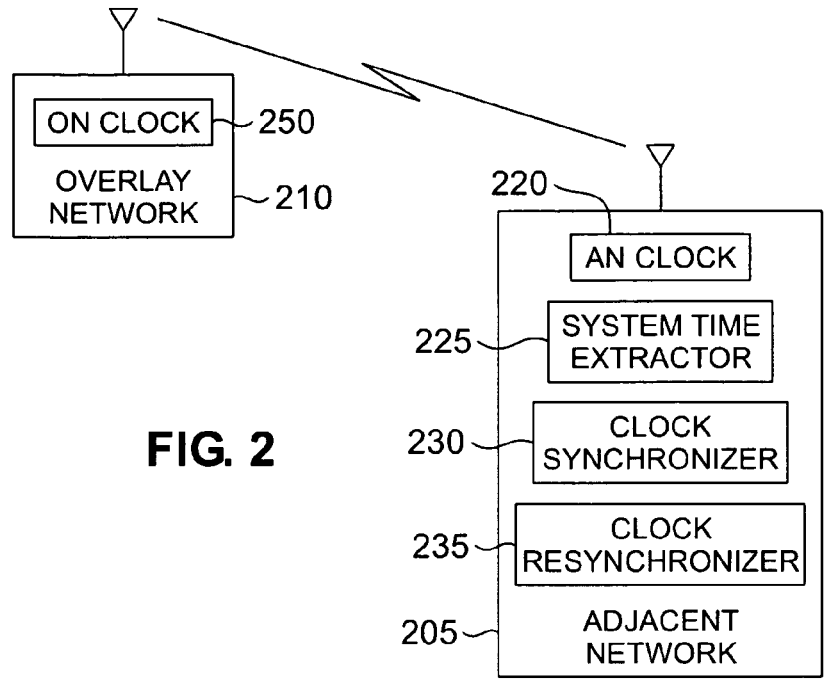
FIG. 2 illustrates a portion of the wireless network of FIG. 1 during a synchronization process for a clock of an adjacent network while the adjacent network is in an idle mode according to an embodiment of the present disclosure.

FIG. 2 illustrates a portion of wireless network 100 during a synchronization process for a clock of an adjacent network 205 to a clock of an associated overlay network 210 while adjacent network 205 is in an idle mode according to an embodiment of the present disclosure. The idle mode comprises a mode in which adjacent network 205 is able to monitor overhead channels of overlay network 210, such as when adjacent network 205 is initially put into service or when adjacent network 205 is not servicing any mobile stations. It will be understood that, for some embodiments, adjacent network 205 may correspond to adjacent network 195 of FIG. 1 and overlay network 210 may correspond to base station 101 of FIG. 1.

For the illustrated embodiment, in addition to an adjacent network (AN) clock 220, adjacent network 205 comprises a system time extractor 225, a clock synchronizer 230, and a clock resynchronizer 235, while overlay network 210 comprises an overlay network (ON) clock 250. Although illustrated and described as three separate components, it will be understood that any two or all of system time extractor 225, clock synchronizer 230, and clock resynchronizer 235 may be implemented together as a single component without departing from the scope of the present disclosure. In addition, it will be understood that adjacent network 205 and overlay network 210 may comprise additional components other than those illustrated in FIG. 2.

Adjacent network 205 operates using an AN clock signal generated by AN clock 220. As described in more detail below, AN clock 220 is operable for synchronization with ON clock 250. Thus, after synchronization, adjacent network 205 may operate using a clock signal that has been synchronized to the clock signal for overlay network 210.

System time extractor 225 is operable to monitor overhead channels transmitted by overlay network 210 for a system time reference for use by adjacent network 205 in wireless communication and to extract the system time reference from the overhead channels. System time extractor 225 is also operable to establish a reference time for adjacent network 205 based on the system time reference extracted from the overhead channels.

Clock synchronizer 230 is operable to monitor overhead channels (or traffic channels) transmitted by overlay network 210 for the ON clock signal used by ON clock 250 and to extract the ON clock signal from the overhead channels. Clock synchronizer 230 is also operable to synchronize AN clock 220 to ON clock 250 based on the ON clock signal extracted from the overhead channels.

Clock resynchronizer 235 is operable to fine-tune, or resynchronize, AN clock 220 when the AN clock signal generated by AN clock 220 is not precisely synchronized to ON clock 250 due to a delay between the networks 205 and 210. In order to resynchronize AN clock 220, clock resynchronizer 235 is operable to extract location information, such as Global Positioning System (GPS) coordinates, if available, for overlay network 210. Using the location information for overlay network 210 in conjunction with the known location of adjacent network 205, clock resynchronizer 235 is operable to determine a one-way delay between overlay network 210 and adjacent network 205. Clock resynchronizer 235 is then operable to fine-tune, or resynchronize, AN clock 220 based on the one-way delay such that AN clock 220 is more precisely synchronized to ON clock 250.

Figure 3:
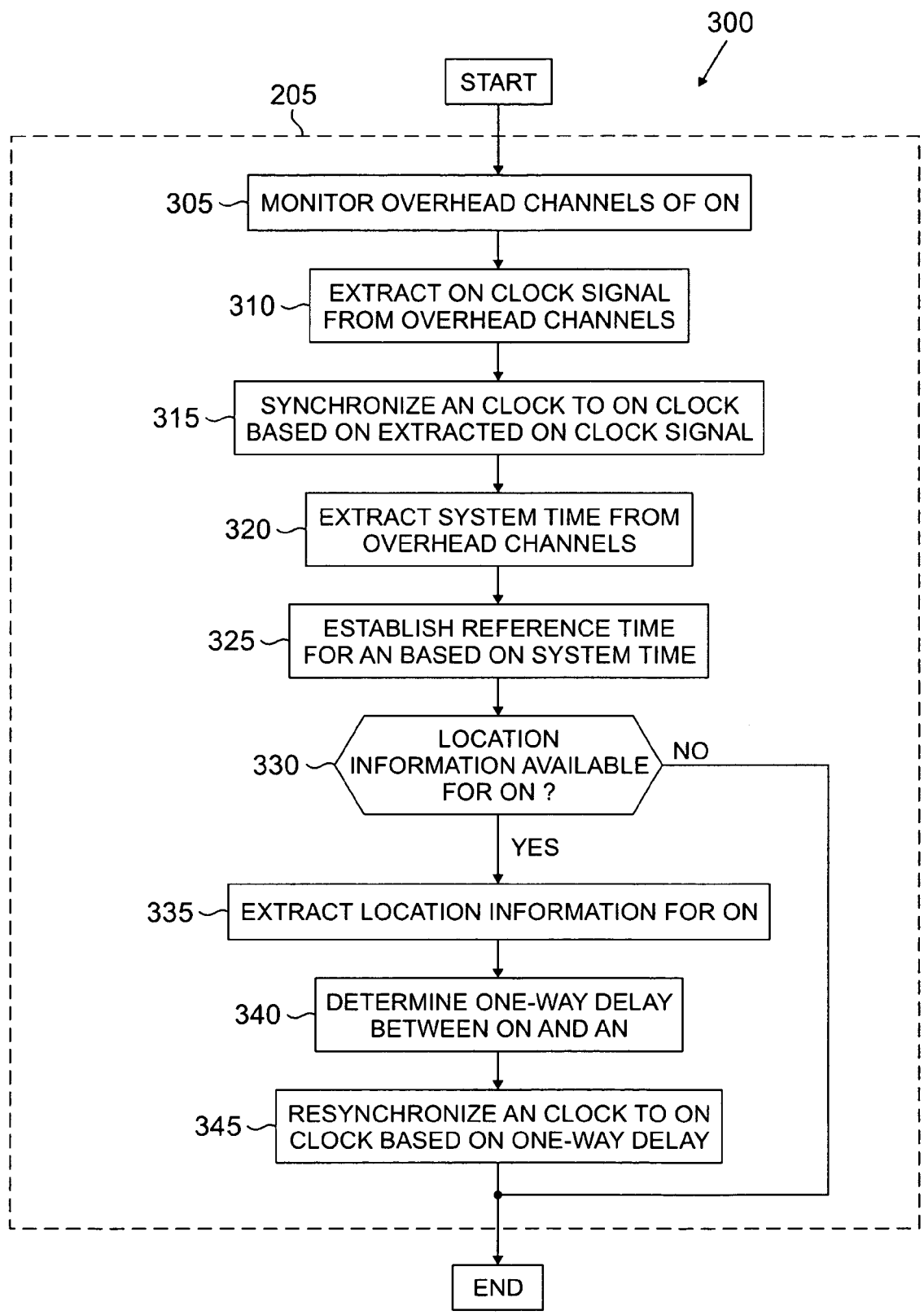
FIG. 3 is a flow diagram illustrating a method for synchronizing the clock for the adjacent network of FIGS. 1 or 2 while the adjacent network is in an idle mode according to an embodiment of the present disclosure.

FIG. 3 is a flow diagram illustrating a method 300 for synchronizing AN clock 220 to ON clock 250 while adjacent network 205 is in an idle mode according to an embodiment of the present disclosure. Initially, system time extractor 225 and clock synchronizer 230 monitor overhead channels of overlay network (ON) 210 (process step 305). Clock synchronizer 230 extracts an ON clock signal from the overhead channels (process step 310) and synchronizes AN clock 220 to ON clock 250 based on the extracted ON clock signal (process step 315). System time extractor 225 extracts a system time from the overhead channels (process step 320) and establishes a reference time for adjacent network (AN) 205 based on the extracted system time (process step 325). In another embodiment, the reference time is established based on an extracted system time before the AN clock 220 is synchronized with the ON clock 250. That is, according to an embodiment, system time extractor 225 may extract the extracts a system time from the overhead channels (process step 320) and establish a reference time for adjacent network (AN) 205 based on the extracted system time (process step 325) before the clock synchronizer 230 extracts an ON clock signal from the overhead channels (process step 310) and synchronizes the AN clock 220 to the ON clock 250 based on the extracted ON clock signal (process step 315).

If location information, such as GPS coordinates, is available for overlay network 210 (process step 330), clock resynchronizer 235 extracts the location information for overlay network 210 (process step 335). Clock resynchronizer 235 then determines a one-way delay between overlay network 210 and adjacent network 205 based on the extracted location information and the known location of adjacent network 205 (process step 340). Finally, clock resynchronizer 235 resynchronizes AN clock 220 to ON clock 250 by fine-tuning the synchronization based on the one-way delay (process step 345).

Figure 4:
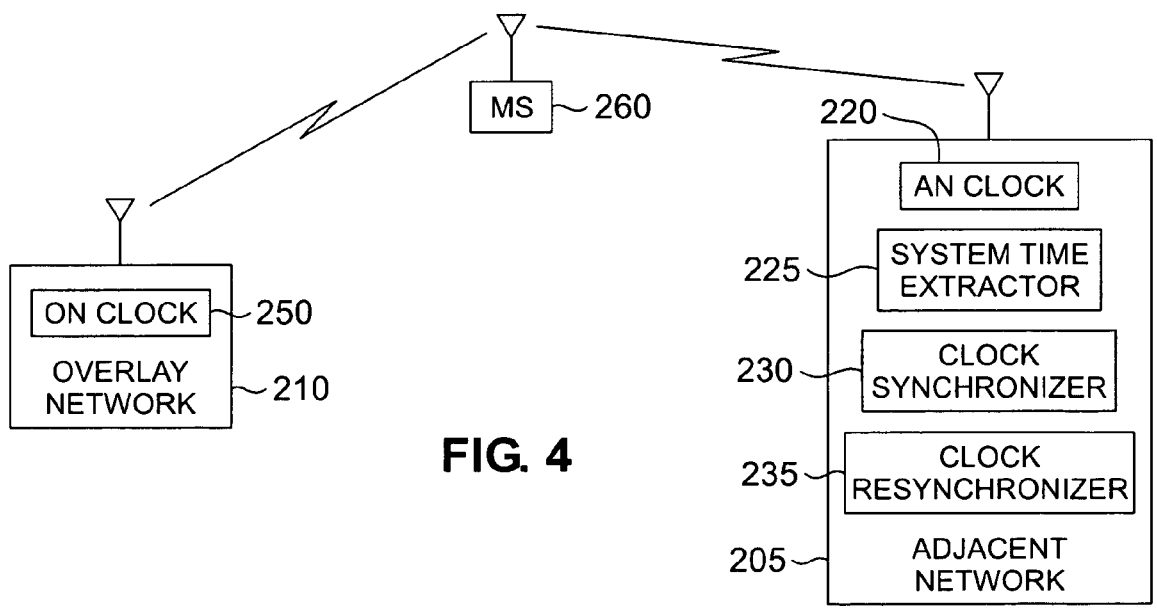
FIG. 4 illustrates a portion of the wireless network of FIG. 1 during a resynchronization process for a clock of the adjacent network of FIG. 2 while the adjacent network is in a traffic mode according to an embodiment of the present disclosure.

FIG. 4 illustrates a portion of wireless network 100 during a resynchronization process for a clock of an adjacent network 205 to a clock of an associated overlay network 210 while adjacent network 205 is in a traffic mode according to an embodiment of the present disclosure. The traffic mode comprises a mode in which adjacent network 205 is able to service mobile stations but is unable to monitor overhead channels of overlay network 210. For an alternate embodiment, adjacent network 205 may be able to monitor overhead channels of overlay network 210 while servicing mobile stations; however, this embodiment of adjacent network 205 may maintain synchronization by continuing to monitor overhead channels.

It will be understood that adjacent network 205 and overlay network 210 illustrated in FIG. 4 correspond to the networks 205 and 210 illustrated in FIG. 2 and that these networks 205 and 210 function as described above when in the idle mode. In addition, the portion of wireless network 100 illustrated in FIG. 4 comprises a mobile station 260. It will be understood that mobile station 260 may correspond to mobile station 111 of FIG. 1 or any other suitable mobile station capable of communicating with both adjacent network 205 and overlay network 210.

For this embodiment, clock resynchronizer 235 is operable to fine-tune, or resynchronize, AN clock 220 when the AN clock signal generated by AN clock 220 shifts away from being synchronized to ON clock 250. In order to resynchronize AN clock 220, clock resynchronizer 235 is operable to request a timing report from at least one mobile station, such as mobile station 260. In addition, clock resynchronizer 235 may be operable to request a series of timing reports from mobile station 260 at a specified frequency.

Mobile station 260 is operable to monitor overlay network 210 while being serviced by adjacent network 205 in a traffic mode. Thus, mobile station 260 is operable to generate timing reports for adjacent network 205 that comprise timing information for overlay network 210. The timing information comprises an ON time offset reference for overlay network 210 that is based on a time offset reference for mobile station 260, which corresponds to an AN time offset reference since mobile station 260 is synchronized to adjacent network 205.

Clock resynchronizer 235 is aware of the ON time offset reference. Thus, clock resynchronizer 235 is operable to compare the known ON time offset reference to the ON time offset reference received in the timing report from mobile station 260. If the two time offset references do not match, clock resynchronizer 235 is operable to fine-tune, or resynchronize, AN clock 220 based on the difference in the time offset references. Clock resynchronizer 235 is operable to continue to fine-tune AN clock 220 based on subsequent timing reports until no difference exists between the two time offset references, at which time AN clock 220 is once again synchronized to ON clock 250.

Figure 5:
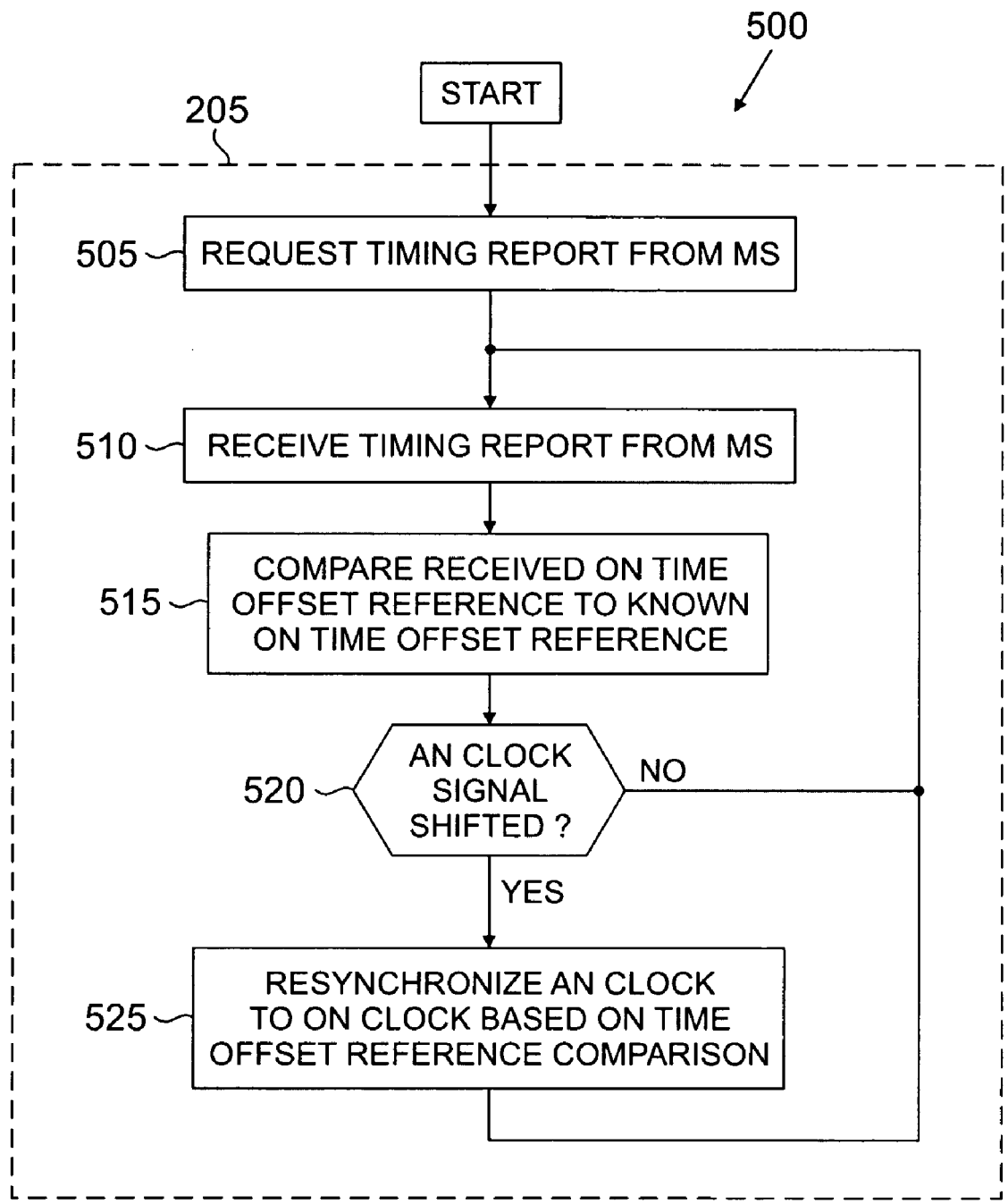
FIG. 5 is a flow diagram illustrating a method for resynchronizing the clock for the adjacent network of FIGS. 1 or 4 while the adjacent network is in a traffic mode according to an embodiment of the present disclosure.

FIG. 5 is a flow diagram illustrating a method 500 for resynchronizing AN clock 220 to ON clock 250 while adjacent network 205 is in a traffic mode according to an embodiment of the present disclosure. Initially, clock resynchronizer 235 requests at least one timing report from at least one mobile station (MS), such as mobile station 260 (process step 505). For some embodiments, clock resynchronizer 235 requests a series of timing reports at a specified frequency from mobile station 260.

After mobile station 260 monitors overlay network 210, generates the timing report, and transmits the timing report, clock resynchronizer 235 receives the timing report from mobile station 260 (process step 510). Clock resynchronizer 235 then compares the ON time offset reference provided in the timing report received from mobile station 260 to a known ON time offset reference (process step 515).

Clock resynchronizer 235 determines whether the AN clock signal generated by AN clock 220 has shifted such that AN clock 220 is no longer synchronized to ON clock 250 based on the comparison (process step 520). Thus, if there is no difference between the time offset references, clock resynchronizer 235 determines that the AN clock signal has not shifted. However, if there is a difference between the time offset references, clock resynchronizer 235 determines that the AN clock signal has shifted by an amount that is determined based on the difference.

If the AN clock signal has not shifted (process step 520), clock resynchronizer 235 may receive a subsequent timing report from mobile station 260 at the specified frequency based on the previous request (process step 510). For other embodiments, if the AN clock signal has not shifted (process step 520), clock resynchronizer 235 may request a subsequent timing report at any suitable time (process step 505) instead of receiving a previously requested timing report at the specified frequency (process step 510).

If the AN clock signal has shifted (process step 520), clock resynchronizer 235 resynchronizes AN clock 220 to ON clock 250 based on the difference in time offset references determined in the comparison of the time offset references (process step 525), after which clock resynchronizer 235 may receive another timing report at the specified frequency (process step 510) or, alternatively, may request another timing report at any suitable time (process step 505).

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of synchronizing a clock for an adjacent network (AN) to a clock for an overlay network (ON), comprising:
    determining whether a wireless access point for the AN is providing service to at least one mobile station in a service area of the wireless access point;
    in response to determining that the wireless access point is not providing service to at least one mobile station:
        determining that the AN is in an idle mode and able to receive an ON clock signal from the ON;
        extracting the ON clock signal from an outgoing signal transmitted wirelessly from the ON;
        synchronizing the AN clock to the ON clock based on the extracted ON clock signal;
        extracting a system time from the outgoing signal;
        determining whether location information of the ON is available; and
        resynchronizing the AN clock to the ON clock based on at least the extracted system time and the location information in response to determining that the location information of the ON is available.

2. The method as set forth in claim 1, the outgoing signal comprising a signal in an overhead channel transmitted from the ON.

3. The method as set forth in claim 2, further comprising monitoring the overhead channel.

4. The method as set forth in claim 1, further comprising: establishing a reference time for the AN based on the extracted system time.

5. The method as set forth in claim 1, wherein resynchronizing the AN clock comprises:
  extracting location information for the overlay network;
  determining a one-way delay between the ON and the AN based on the location information and the reference time; and
  resynchronizing the AN clock to the ON clock based on the one-way delay.

6. The method as set forth in claim 1, wherein the AN is an underlay network providing service within a portion of a service area of the overlay network.

7. The method as set forth in claim 1, further comprising:
  in response to determining that the wireless access point is providing service to at least one mobile station:
    determining that the AN is in a traffic mode and unable to monitor an overhead channel of ON;
    requesting at least one timing report from at least one mobile station;
    receiving the at least one timing report from the at least one mobile station; and
    resynchronizing the AN clock to the ON clock based on the at least one timing report.

8. The method as set forth in claim 7, the timing report comprising an ON time offset reference.

9. The method as set forth in claim 1, further comprising clocking the AN using the synchronized AN clock signal.

10. A method of synchronizing a clock for an adjacent network (AN) to a clock for an overlay network (ON), comprising:
  determining whether a wireless access point for the AN is providing service to at least one mobile station in a service area of the wireless access point;
  in response to determining that the wireless access point is not providing service to at least one mobile station:
    determining that the AN is in an idle mode;
    synchronizing the AN clock to the ON clock based on an ON clock signal extracted from an outgoing signal transmitted wirelessly from the ON; and
    resynchronizing the AN clock to the ON clock based on at least an extracted time and location information when the location information of the ON is available; and
  in response to determining that the wireless access point is providing service to at least one mobile station:
    determining that the AN is in a traffic mode;
    requesting a plurality of timing reports at a specified frequency from the at least one mobile station;
    receiving the timing reports from the at least one mobile station at the specified frequency; and
    for each timing report received from the at least one mobile station, determining whether to resynchronize the AN clock to the ON clock based on the received timing report.

11. The method as set forth in claim 10, each timing report comprising an ON time offset reference.

12. The method as set forth in claim 11, determining whether to resynchronize the AN clock to the ON clock based on the received timing report comprising:
  comparing the received ON time offset reference to a known ON time offset reference; and
  determining whether to resynchronize the AN clock to the ON clock based on the comparison of the received ON time offset reference, the ON time offset reference associated with an offset between a system time of the ON and a reference time of the AN.

13. The method as set forth in claim 12, further comprising, when the AN is in the idle mode:
  monitoring an overhead channel transmitted by the ON;
  extracting the system time of the ON from the overhead channel; and
  establishing the reference time of the AN based on the extracted system time.

14. An apparatus configured to synchronize a clock for an adjacent network (AN) to a clock for an overlay network (ON), the apparatus comprising:
  a clock synchronizer configured to determine whether a wireless access point for the AN is providing service to at least one mobile station in a service area of the wireless access point, and in response to determining that the wireless access point is not providing service to at least one mobile station, determine that the AN is in an idle mode and able to receive an ON clock signal from the ON, extract the ON clock signal from an outgoing signal transmitted wirelessly from the ON, and synchronize the AN clock to the ON clock based on the extracted ON clock signal;
  a system time extractor configured to extract a system time from the outgoing signal when the AN is in the idle mode; and
  a clock resynchronizer configured to resynchronize the AN clock to the ON clock based on at least the extracted system time and location information of the ON when the AN is in the idle mode and the location information of the ON is available.

15. The apparatus as set forth in claim 14, the AN clock configured to clock the AN by generating the synchronized AN clock signal.

16. The apparatus as set forth in claim 14, the clock synchronizer further configured to monitor an overhead channel for the outgoing signal when the AN is in the idle mode, wherein the ON clock signal is transmitted on the overhead channel.

17. The apparatus as set forth in claim 14, wherein the system time extractor is further configured to, when the AN is in the idle mode, monitor an overhead channel and establish a reference time for the AN based on the extracted system time.

18. The apparatus as set forth in claim 17, wherein the clock resynchronizer is further configured to, when the AN is in the idle mode and the location information for the ON is available, extract the location information for the ON, determine a one-way delay between the ON and the AN based on the location information and the reference time, and resynchronize the AN clock to the ON clock based on the one-way delay.

19. The apparatus as set forth in claim 18, wherein the clock resynchronizer is further configured to, in response to determining that the wireless access point is providing service to at least one mobile station, determine that the AN is in a traffic mode and unable to monitor an overhead channel of ON, receive at least one timing report from at least one mobile station, and resynchronize the AN clock to the ON clock based on the at least one timing report.

20. The apparatus as set forth in claim 14, wherein the AN is an underlay network providing service within a portion of a service area of the overlay network.

* * * * *